(12) United States Patent
Yoshida et al.

(10) Patent No.: US 7,969,455 B2
(45) Date of Patent: Jun. 28, 2011

(54) IMAGE CALIBRATION DEVICE AND METHOD

(75) Inventors: Shohei Yoshida, Shimosuwa-machi (JP); Takashi Toyooka, Suwa (JP); Hidehito Iisaka, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 775 days.

(21) Appl. No.: 11/378,564

(22) Filed: Mar. 20, 2006

(65) Prior Publication Data

US 2006/0285025 A1    Dec. 21, 2006

(30) Foreign Application Priority Data

Jun. 15, 2005    (JP) ................................. 2005-174885

(51) Int. Cl.
    *G09G 5/10*    (2006.01)
(52) U.S. Cl. .......................................... 345/690; 345/89
(58) Field of Classification Search .................... 345/40, 345/57, 68, 690; 340/120; 348/177–183, 348/189–191
    See application file for complete search history.

(56) References Cited

U.S. PATENT DOCUMENTS

| | | | |
|---|---|---|---|
| 4,760,447 A * | 7/1988 | Koka et al. ..................... 348/184 |
| 5,245,326 A * | 9/1993 | Zalph .............................. 345/92 |
| 5,245,413 A * | 9/1993 | Teichner et al. ............... 348/181 |
| 5,298,993 A * | 3/1994 | Edgar et al. .................... 348/180 |
| 5,343,242 A * | 8/1994 | Rowsell et al. ................ 348/181 |
| 5,351,201 A * | 9/1994 | Harshbarger et al. ......... 348/187 |
| 5,369,432 A | 11/1994 | Kennedy |
| 5,717,422 A | 2/1998 | Fergason |
| 5,764,209 A * | 6/1998 | Hawthorne et al. ............. 345/87 |
| 5,796,425 A * | 8/1998 | Minami et al. ................ 348/181 |
| 6,054,972 A | 4/2000 | Otani et al. |
| 6,177,955 B1 * | 1/2001 | Downen et al. ............... 348/189 |
| 6,327,708 B1 * | 12/2001 | Monsees .......................... 725/12 |
| 6,388,678 B1 * | 5/2002 | Kasahara et al. ............. 345/690 |
| 6,628,324 B1 * | 9/2003 | Onishi et al. .................. 348/177 |
| 6,714,670 B1 * | 3/2004 | Goldsworthy et al. ....... 382/149 |

(Continued)

FOREIGN PATENT DOCUMENTS

CN    1124357 A    6/1996

(Continued)

OTHER PUBLICATIONS

Iisaka et al., "Novel Projection System Based on an Adaptive Dynamic Range Control Concept," IDW '03, LAD1-4, pp. 1553-1556 (Dec. 3-5, 2003).

*Primary Examiner* — Chanh Nguyen
*Assistant Examiner* — Robert M Stone
(74) *Attorney, Agent, or Firm* — Oliff & Berridge, PLC (57) ABSTRACT

An image display device for displaying an image on the basis of an image signal supplied from an image supply device includes a brightness detecting section that detects a gray level which characterizes brightness of a predetermined pattern image from a pattern image signal when the predetermined pattern image is supplied from the image supply device; a storing section that stores a reference gray level predetermined in the pattern image; a correction parameter setting section that sets a correction parameter for compensating by a difference between the gray level detected by the brightness detecting section and the reference gray level stored in the storing section; and a correcting section that corrects the brightness of the image signal supplied from the image supply device on the basis of the correction parameter.

10 Claims, 7 Drawing Sheets

U.S. PATENT DOCUMENTS

| | | | |
|---|---|---|---|
| 6,816,141 B1 | 11/2004 | Fergason | |
| 7,239,295 B2 | 7/2007 | Kang et al. | |
| 2002/0047550 A1* | 4/2002 | Tanada | 315/155 |
| 2003/0063110 A1* | 4/2003 | Sagano et al. | 345/694 |
| 2003/0086265 A1 | 5/2003 | Ilsaka et al. | |
| 2003/0193565 A1* | 10/2003 | Wen | 348/184 |
| 2003/0214586 A1* | 11/2003 | Lee et al. | 348/180 |
| 2004/0240723 A1* | 12/2004 | Sakai et al. | 382/141 |
| 2004/0246275 A1* | 12/2004 | Yoshihara et al. | 345/690 |
| 2006/0071936 A1* | 4/2006 | Leyvi et al. | 345/589 |
| 2007/0052735 A1* | 3/2007 | Chou | 345/690 |

FOREIGN PATENT DOCUMENTS

| | | |
|---|---|---|
| CN | 1426039 A | 6/2003 |
| JP | 07-505485 A | 6/1995 |
| JP | A-8-263031 | 10/1996 |
| JP | 10277223 * | 10/1998 |
| JP | A-11-133908 | 5/1999 |
| JP | A 2003-121926 | 4/2003 |
| JP | A 2003-177374 | 6/2003 |
| JP | A 2004-096556 | 3/2004 |
| JP | 2004-177458 A | 6/2004 |
| JP | A 2005-107019 | 4/2005 |

* cited by examiner

FIRST PATTERN IMAGE

| POSITIONAL INFORMATION (AREA) | REFERENCE BRIGHTNESS PARAMETER |
|---|---|
| 10a | 0 |
| 10b | 16 |
| 10c | 32 |
| 10d | 48 |

THIRD PATTERN IMAGE

| POSITIONAL INFORMATION (AREA) | REFERENCE BRIGHTNESS PARAMETER |
|---|---|
| 12a | 64 |
| 12b | 80 |
| 12c | 96 |
| 12d | 112 |

| POSITIONAL INFORMATION (AREA) | BRIGHTNESS PARAMETER |
|---|---|
| 10a | 0 |
| 10b | 15 |
| 10c | 29 |
| 10d | 43 |

FIG. 8

| BRIGHTNESS PARAMETER (INPUT GRADATION) | CORRECTION COEFFICIENT k |
|---|---|
| 0 | 0 |
| ⋮ | ⋮ |
| 15 | 1.067 |
| ⋮ | ⋮ |
| 29 | 1.103 |
| ⋮ | ⋮ |
| 43 | 1.116 |
| ⋮ | ⋮ |
| 255 | |

FIG. 9

IMAGE CALIBRATION DEVICE AND METHOD

BACKGROUND

1. Technical Field

The present invention relates to an image display device and a method of displaying the image.

2. Related Art

In association with development of IT technology in the recent years, a need of image display devices is increased in various fields. Among such image display devices, a liquid crystal projector that projects an image emitted from an optical system using a liquid crystal light valve onto a screen via a projection lens in an enlarged scale is widely used as a mode of a liquid crystal display device that can change optical characteristics by electrically controlling an array of liquid crystal molecules.

The liquid crystal projector employs the liquid crystal light valve as light modulating means. However, since the range of brightness that can be displayed (dynamic range) is narrow due to light leakage or stray light generated at various optical components that constitute the optical system, it is difficult to improve the quality of the image. Therefore, as a method of enlarging the dynamic range, a method of changing the light amount incoming into the liquid crystal light valve according to an image signal (light modulation process) while expanding the image signal (expansion process) (adaptive image processing) has been proposed in the related art.

The liquid crystal projector as described above receives supply of image signals, that is, an image from an image supply device such as a DVD (Digital Versatile Disk) player, a video player, or a PC (Personal Computer), and projects the image onto a screen in an enlarged scale. The image supply device as described above applies γ correction on the image signal corresponding to γ characteristics of the liquid crystal projector, and supplies the image signal after having applied with the γ correction to the liquid crystal projector. There is no problem when the predetermined image supply device is connected to the liquid crystal projector. However, there is a problem such that when another different image supply device is connected thereto, since the γ correction process for the image signal is also different, mismatch with the γ characteristics of the liquid crystal projector may occur, and consequently, a desired image display cannot be achieved. In particular, the liquid crystal projector having an adaptive image processing function as described above has a problem such that if the supplied image signal varies according to the image supply device to be connected, the adaptive image processing function does not work effectively.

In order to prevent the mismatch between the γ characteristics of the image display device and the γ correction of the image supply device, for example, JP-A-2004-96556 discloses a technique for achieving a suitable image display with an image display device that displays the image signal supplied from the image supply device by supplying an image signal of a specific pattern from the image supply device, detecting a γ value of the image signal of the specific pattern, calculating a correction value from a detected γ value and a γ value of the image display device, and applying the γ correction on the image signal on the basis of the correction value without depending on the image supply device.

However, in recent years, an image display device with a high-performance such as applying γ correction differently for each color signal (RGB) or applying γ correction differently according to image scenes is required for further improving the quality of image display. In order to apply several types of γ corrections as described above, it is necessary to apply very complicated γ correction process for preventing the mismatch between the γ characteristics of the image display device and the γ correction of the image supply device, and hence there arises a problem such that a response of the image processing is delayed.

SUMMARY

An advantage of some aspects of the invention is to achieve a desired image display by a relatively simple correction process of an image signal without depending on an image supply device.

In order to solve the above-described problems, as solving means relating to the image display device, the invention provides an image display device for displaying an image on the basis of an image signal supplied from an image supply device including: brightness information detecting means that detects a gray level which characterizes brightness of a predetermined pattern image from a pattern image signal when the predetermined pattern image is supplied from the image supply device; storing means that stores a reference gray level predetermined in the pattern image; correction parameter setting means that sets a correction parameter for compensating by a difference between the gray level detected by the brightness information detecting means and the reference gray level stored in the storing means; and correcting means that corrects the brightness of the image signal supplied from the image supply device on the basis of the correction parameter. According to an aspect of the invention, the pattern image set at a predetermined gray level (reference gray level) in advance is outputted from the image supply device to the image display device. In other words, the pattern image signal indicating the pattern image outputted from the image supply device is a signal applied with γ correction by the image supply device. Therefore, whether or not the γ correction process performed in the image supply device matches γ characteristics of the image display device can be determined by detecting the gray level which characterizes the brightness of the pattern image signal and comparing the same with the reference gray level. Therefore, a desired image display is achieved with a relatively simple process by setting the correction parameter for compensating by the difference between the gray level of the pattern image signal supplied from the image supply device and the reference gray level, and correcting the brightness of the image signal supplied from the image supply device on the basis of the correction parameter. The correction process for the brightness of the image signal can be performed without depending on the image supply device by setting the correction parameter for each image supply device.

Preferably, the pattern image is composed of a black full-frame pattern set to a black level, the brightness information detecting means detects a gray level of the entirely black pattern, and the storing means stores a reference gray level of the entirely black pattern in advance. In this arrangement, unnecessary brightness of black color can be prevented by specifically performing the brightness correction process for the black level.

Preferably, the pattern image is composed of a white full-frame pattern set to a white level, the brightness information detecting means detects a gray level of the white full-frame pattern, and the storing means stores a reference gray level of the white full-frame pattern in advance. In this arrangement, unnecessary lowering of brightness of the while level can be prevented by performing the brightness correction process especially for the white level.

Preferably, the pattern image is configured so that the pattern images each including a plurality of areas on one frame and each area being set to a predetermined gray level and pattern images each set to one gray level for one entire frame appears alternately at certain time intervals, the brightness information detecting means detects the gray levels which characterize the brightness of the plurality of areas respectively, and the storing means stores the reference gray levels for the plurality of areas respectively in advance. In this arrangement, by setting brightness of the respective areas of the pattern images at different reference gray levels, correction parameters corresponding to the respective reference gray levels can be obtained, whereby the brightness correction process can be performed for all the gradations of the displayed image thereby displaying an accurate gray scale. By configuring the pattern images so that pattern images each including one or a plurality of areas each set to a predetermined gray level in one frame and pattern images each set to one gray level for the entire frame appear alternately at the certain time intervals, a timing of switching-over of the pattern images can be determined, and hence the correction parameters corresponding to the reference gray levels which are set to the respective areas can be set accurately.

Preferably, the brightness information detecting means detects the gray levels at a plurality of points for each of the plurality of areas, and determines an average value of the gray levels at the plurality of points as the gray level for each of the plurality of areas. In this arrangement, by obtaining the average value, fluctuation in brightness (gray level) due to noise or the like can be reduced, and hence the gray level for each area can be determined with high degree of accuracy.

Preferably the brightness information detecting means sets smaller region in the respective areas as detection areas, and detects gray levels for the respective detection areas. In this arrangement, by setting the smaller regions in the respective areas as the detection areas, erroneous detection of the gray level of another adjacent area can be prevented.

Preferably, the correction parameter setting means calculates a correction coefficient by dividing the reference gray level by the gray level detected by the brightness information detecting means, and setting the correction coefficient as the correction parameter, and the correcting means corrects the brightness of the image by multiplying the gray level contained in the image signal supplied from the image supply device by the correction coefficient. In this arrangement, since the brightness of the image is corrected by using the correction coefficient obtained by dividing the reference gray level by the gray level detected by the information detecting means as the correction parameter, and multiplying the gray level contained in the image signal supplied from the image supply device by the correction coefficient, a desired image display can be achieved with a relatively simple process.

Preferably, light modulation processing means for adjusting a light amount of an illumination light and an expansion processing means for expanding the gray level contained in the image signal are further provided. In this arrangement, even with the image display device provided with the light modulating function and the expanding function, that is, the adaptive image processing function, the desired image display is enabled with the relatively simple image signal correction process without depending on the image supply device.

On the other hand, according to another aspect of the invention, an image display method for displaying an image on the basis of an image signal supplied from the image supply device including a first step of storing a reference gray level set for a predetermined pattern image in advance; a second step of detecting a gray level which characterizes the brightness of the pattern image from the pattern image signal when the pattern image is supplied from the image supply device; a third step of setting a correction parameter for compensating by a difference between the gray level detected in the second step and the reference gray level stored in the first step; and a fourth step of correcting the brightness of the image signal supplied from the image supply device on the basis of the correction parameter, is employed as a solving means relating to the image display method. In this arrangement, the desired image display can be achieved with a relatively simple image signal correction process without depending on the image supply means.

BRIEF DESCRIPTION OF THE DRAWINGS

The invention will be described with reference to the accompanying drawings, wherein like numbers reference like elements.

DESCRIPTION OF EXEMPLARY EMBODIMENTS

Referring now to the drawings, an embodiment of the invention will be described. As an example of an image display device employing tan image display method of the invention, a three-panel liquid crystal projector provided with liquid crystal light valves for each different R, G and B colors will be described.

Figure 1:
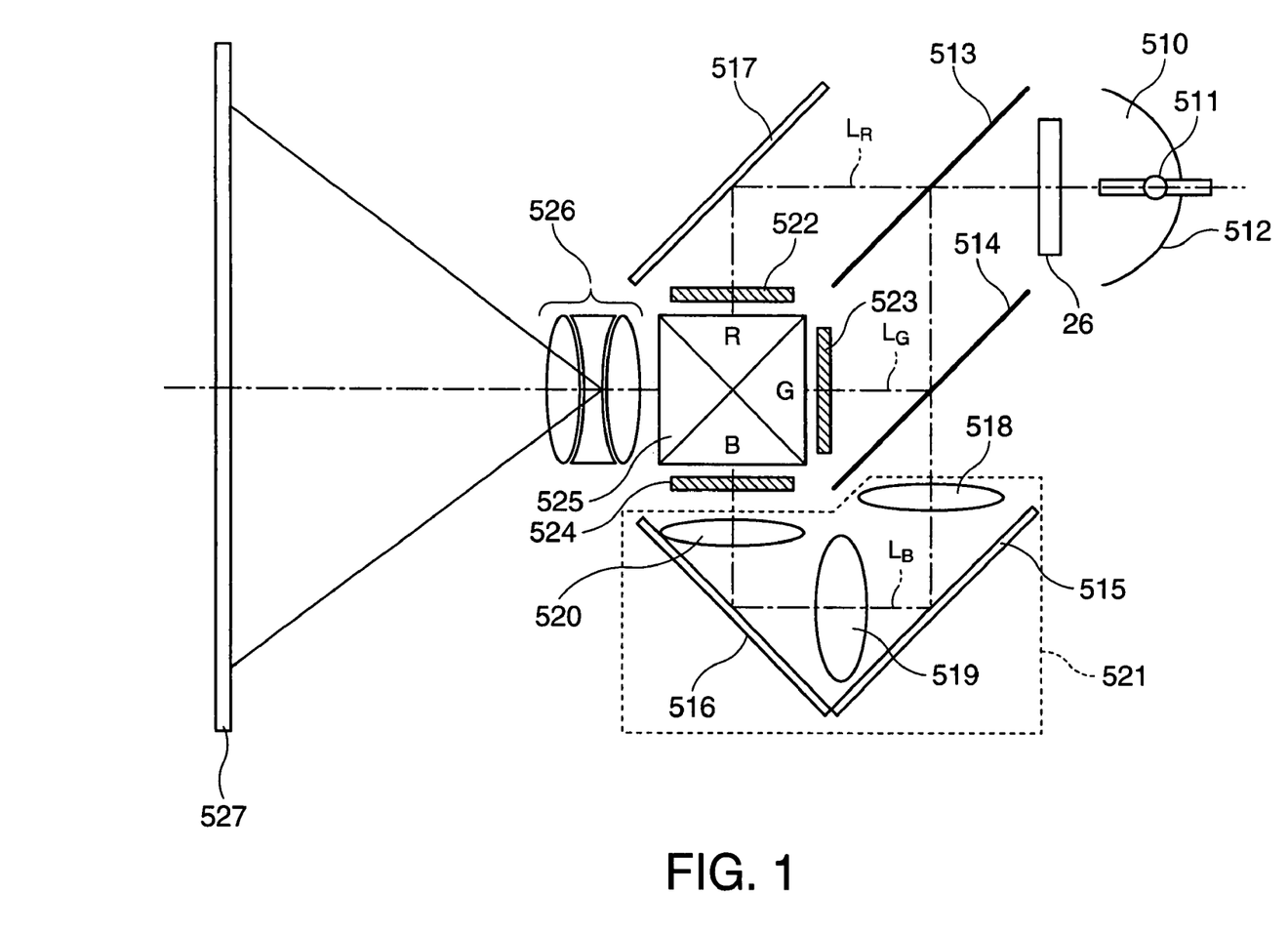
FIG. 1 is a schematic block diagram of a liquid crystal projector B according to an embodiment of the invention.

FIG. 1 is a schematic block diagram showing an example of a liquid crystal projector. As shown in FIG. 1, the liquid crystal projector includes a light source 510, a light modulation element 26, dichroic mirrors 513, 514, reflection mirrors 515, 516, 517, relay lenses 518, 519, 520, a red light liquid crystal light valve 522, a green light liquid crystal light valve 523, a blue light liquid crystal light valve 524, a cross-dichroic prism 525 and a projection lens system 526.

The light source 510 includes a lamp 511 such as an extra-high pressure mercury lamp and a reflector 512 for reflecting light from the lamp 511. Arranged between the light source 510 and the dichroic mirror 513 is the light modulation element 26 that adjusts the light amount from the light source 510. The light modulation element 26 is composed, for example, of a liquid crystal panel which can be changed in coefficient of transmission.

The dichroic mirror 513 transmits red light out of white light incoming from the light source 510 toward the reflection mirror 517 and reflects blue light and green light toward the dichroic mirror 514. The reflection mirror 517 reflects red light incoming from the dichroic mirror 513 toward the red light liquid crystal light valve 522.

On the other hand, the dichroic mirror 514 reflects green light out of blue light and green light incoming from the dichroic mirror 513 toward the green light liquid crystal light valve 523 and transmits blue light toward the relay lens 518. The blue light enters into the blue light liquid crystal light valve 524 via a relay system 521 including the relay lens 518, the reflection mirror 515, the relay lens 519, the reflection mirror 516 and the relay lens 520.

The red light liquid crystal light valve 522, the green light liquid crystal light valve 523 and the blue light liquid crystal light valve 524 modulate three colored lights (red light, green light and blue light) incoming respectively thereto and emit the same to the cross-dichroic prism 525. The cross-dichroic prism 525 is formed by adhering four right-angle prisms so that a dielectric multilayer film that reflects red light and a dielectric multilayer film that reflects blue light are formed on the inner surfaces thereof into a cross-shape. The three colored lights are combined by these dielectric multilayer films and light that generates a color image is formed. The combined light is projected on a frame 527 by the projection lens system 526 as the projection optical system, and the image is displayed in an enlarged scale.

Figure 2:
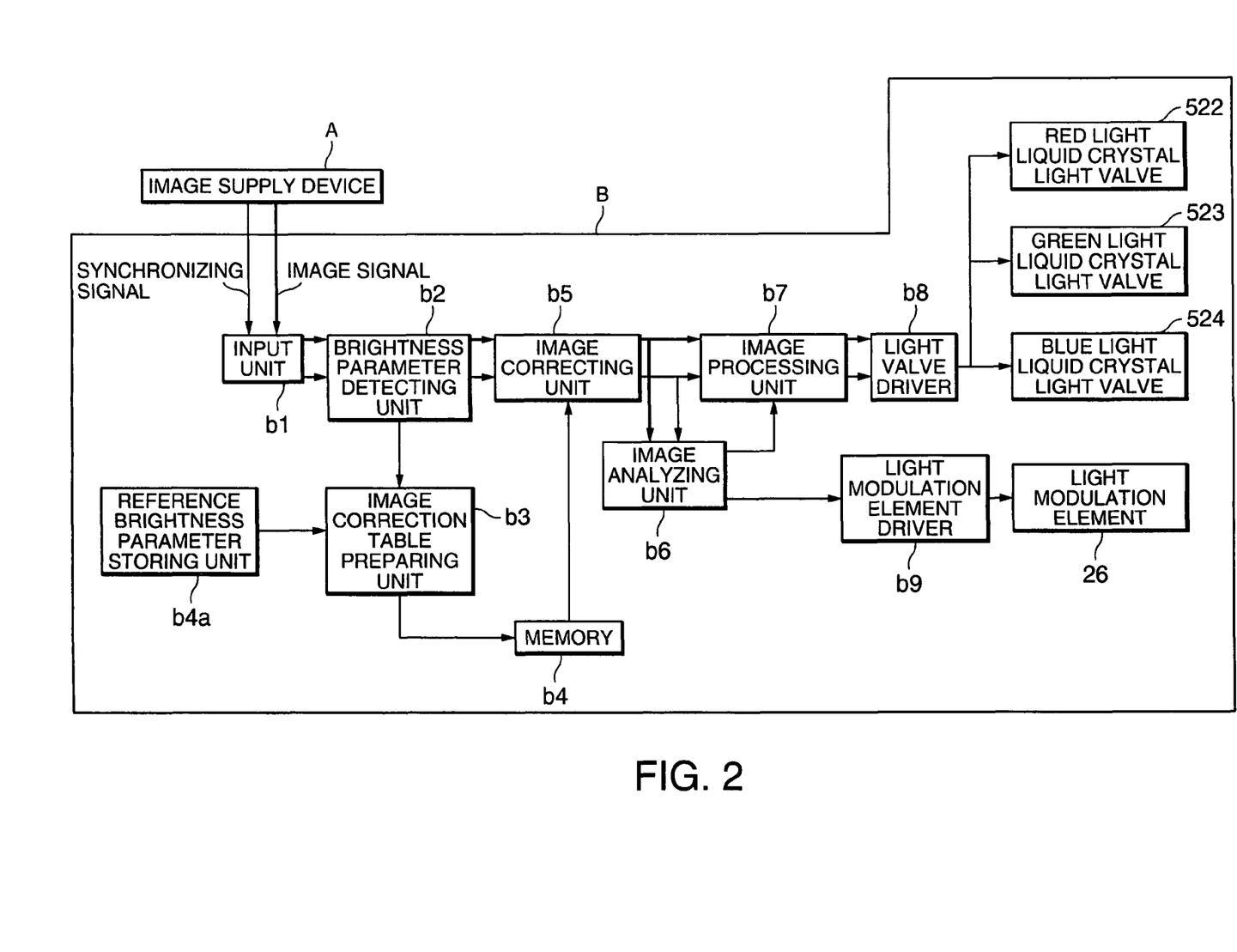
FIG. 2 is a block diagram showing a structure of a drive circuit of the liquid crystal projector B according to the embodiment of the invention.

FIG. 2 is a block diagram showing a structure of a drive circuit of the liquid crystal projector configured as described above. In FIG. 2, reference sign A designates an image supply device, and reference sign B designates a liquid crystal projector. The liquid crystal projector B includes an input unit b1, a brightness parameter detecting unit b2, an image correction table preparing unit b3, a reference brightness parameter storing unit b4a, a memory b4, an image correcting unit b5, an image analyzing unit b6, an image processing unit b7, a light valve driver b8, a light modulation element driver b9, the red right liquid crystal light valve 522, the green light liquid crystal light valve 523, the blue light liquid crystal light valve 524 and the light modulation element 26.

The liquid crystal projector B is provided with two operation modes (an adjustment mode and a normal operation mode). The adjustment mode out of these two operation modes is a mode which detects a brightness parameter (gray level) from adjustment pattern images supplied from the image supply device A and prepares an image correction table on the basis of the brightness parameter, and the normal operation mode is a mode which corrects a predetermined image (image signal) supplied from the image supply device A on the basis of the image correction table and displays an image with the corrected image signal.

The image supply device A is, for example, a DVD player for regenerating an image stored in a predetermined DVD and outputting a synchronizing signal (a horizontal synchronizing signal and a vertical synchronizing signal) together with an image signal that represents the image to the input unit b1 of the liquid crystal projector B. The image signal is a signal applied with γ correction by the image supply device A. In this embodiment, the image supply device A does not apply the γ correction of the image signal according to γ characteristics of the liquid crystal projector B. In other words, in this embodiment, a case in which mismatch occurs between the γ characteristics of the liquid crystal projector B and the γ correction of the image supply device A is assumed.

The input unit b1 of the liquid crystal projector B is an interface for acquiring image information such as the image signal and the synchronizing signal from the image supply device A, and the image signal and the synchronizing signal supplied from the image supply device A are outputted to the brightness parameter detecting unit b2.

In the adjustment mode, the brightness parameter detecting unit b2 converts the image signal (analogue signal) supplied from the input unit b1 to the digital image signal, detects a brightness parameter at a predetermined position in a frame on the basis of the digital image signal and the synchronizing signal, and outputs the brightness parameter to the image correction table preparing unit b3. In the normal operation mode, the brightness parameter detecting unit b2 converts the image signal (analogue signal) supplied from the input unit b1 to the digital image signal, and then the synchronizing signal is outputted to the image correcting unit b5 with the digital image signal without performing the brightness parameter detection process.

The image correction table preparing unit b3 calculates a correction coefficient on the basis of a brightness parameter supplied from the brightness parameter detection unit b2 and a reference brightness parameter (reference gray level) stored in the reference brightness parameter storing unit b4a, prepares the image correction table in which the gradation and the correction coefficient that constitute the digital image signal are coordinated, and stores the image correction table in the memory b4. The reference brightness parameter storing unit b4a and the memory b4 are, for example, readable and writable non-volatile memories such as a flash memory, and the reference brightness parameter storing unit b4a stores the reference brightness parameter in advance, and the memory b4 stores the image correction table.

In the normal operation mode, the image correcting unit b5 applies a predetermined correction process on the digital image signal supplied from the brightness parameter detecting unit b2 on the basis of the image correction table stored in the memory b4, and the synchronizing signal is outputted to the image analyzing unit b6 and the image processing unit b7 with the corrected digital image signal. In the adjustment mode, the image correcting unit b5 is in a non-active state, and the correction process is stopped.

The image analyzing unit b6 sets an expansion parameter and a light modulation parameter suitable for an image scene indicated by the corrected digital image signal on the basis of the corrected digital image signal supplied from the image correcting unit b5, outputs the expansion parameter to the image processing unit b7, and outputs the light modulation parameter to the light modulation element driver b9.

The image processing unit b7 expands the corrected digital image signal on the basis of the expansion parameter supplied from the image analyzing unit b6, converts the expanded digital image signal to the analogue image signal, and then outputs the same to the light valve driver b8 together with the synchronizing signal. The light valve driver b8 generates drive signals for driving the red light liquid crystal light valve 522, the green light liquid crystal light valve 523 and the blue light liquid crystal light valve 524 on the basis of the analogue image signal and the synchronizing signal supplied from the image processing unit b7, and outputs the same to the respective liquid crystal light valves. The red light liquid crystal light valve 522, the green light liquid crystal light valve 523 and the blue light liquid crystal light valve 524 are, as described in conjunction with FIG. 1, is driven by the drive signals, and perform modulation of three colored lights (red light, green light and blue light) incoming thereto respectively.

The light modulation element driver b9 generates a drive signal for driving the light modulation element 26 shown in FIG. 1 on the basis of the light modulation parameter supplied from the image analyzing unit b6, and outputs the drive signal to the light modulation element 26. The light modulation element 26 is driven on the basis of the drive signal, whereby changes the light amount emitted from the light source 510.

In this manner, the liquid crystal projector B is an adaptive image display device having a light modulating function for changing the light amount to be supplied to the liquid crystal light valve according to the image scene and an expanding function for expanding the image signal. Since the light modulating function and the expanding function are technique publicly known as disclosed, for example, in JP-A-2005-107019, detailed description will be omitted, and the operation of the brightness parameter detecting unit b2, the image correction table preparing unit b3 and the image correcting unit b5, which are the most characteristic components in the liquid crystal projector B will mainly be described in detail below.

The operation of the liquid crystal projector B in the adjustment mode will be described.

Adjustment Mode

Figure 3:
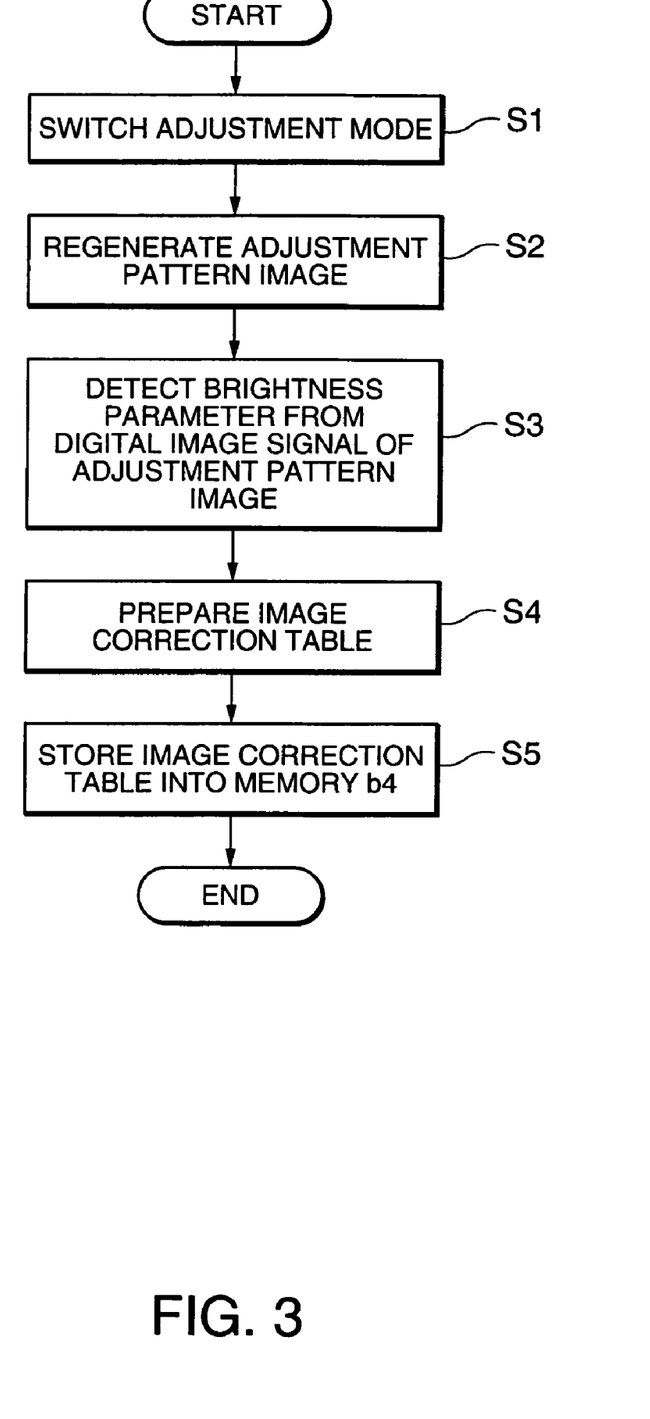
FIG. 3 is a flowchart of a process in an adjustment mode according to the embodiment of the invention.

FIG. 3 is a flowchart showing a procedure of the image correction table preparation process in the adjustment mode. In a first step, the mode is switched to the adjustment mode (Step S1). Such mode switching is performed by providing, for example, a mode changeover switch on the liquid crystal projector B and operating the mode changeover switch by a user.

Subsequently, the adjustment pattern images are supplied from the image supply device A to the liquid crystal projector B (Step S2). In this embodiment, a DVD (adjustment DVD) in which the adjustment pattern images are stored is set in the image supply device A (DVD player) and regenerates the image. Such an adjustment DVD is included in a package when the liquid crystal projector B is shipped. When the image supply device A is a video player, a video tape in which the adjustment pattern images are recorded may be used, and when the image supply device A is a PC, a floppy (registered trademark) disk or the like in which the adjustment pattern images are stored may be used.

Figure 4:
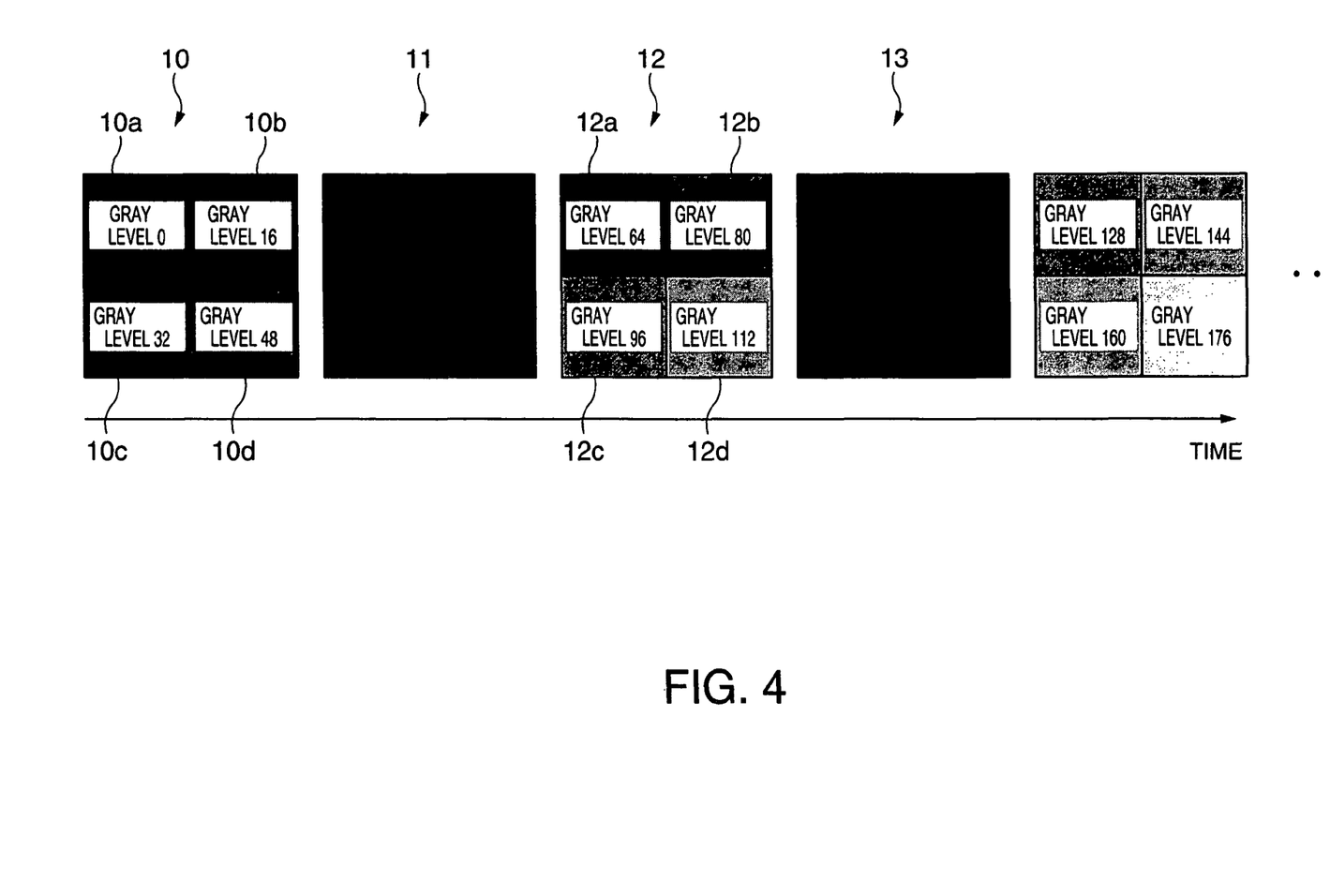
FIG. 4 is a drawing showing a structure of adjustment pattern images according to the embodiment of the invention.

FIG. 4 shows the adjustment pattern images stored in the adjustment DVD. As shown in FIG. 4, the adjustment pattern images are such that one frame is divided into four areas, and gray patterns (including white and black) displayed in predetermined gray levels are set to the respective areas. In this embodiment, the image supply device A and the liquid crystal projector B that display in 256 gray levels from 0 (black) to 255 (white) is assumed. A first pattern image 10 is set into a gray pattern in which a gray level in an area 10a is 0, a gray level in an area 10b is 16, a gray level in an area 10c is 32, and a gray level in an area 10d is 48. A second pattern image 11 is set to 0 in gray level over the entire area, that is, an entirely black pattern. A third pattern image 12 is set to a gray pattern in which a gray level in an area 12a is 64, a gray level in an area 12b is 80, a gray level in an area 12c is 96, and a gray level in an area 12d is 112. A fourth pattern 13 is also the entirely black pattern as the second pattern image 11. In this manner, the adjustment pattern images are set in such a manner that the pattern images divided into four areas (divided pattern images) and the pattern images displayed entirely in black (entirely black pattern images) are displayed alternately at predetermined time interval, and finally, a pattern image at 255 in gray level, that is, a white display pattern image is displayed.

Figure 5:
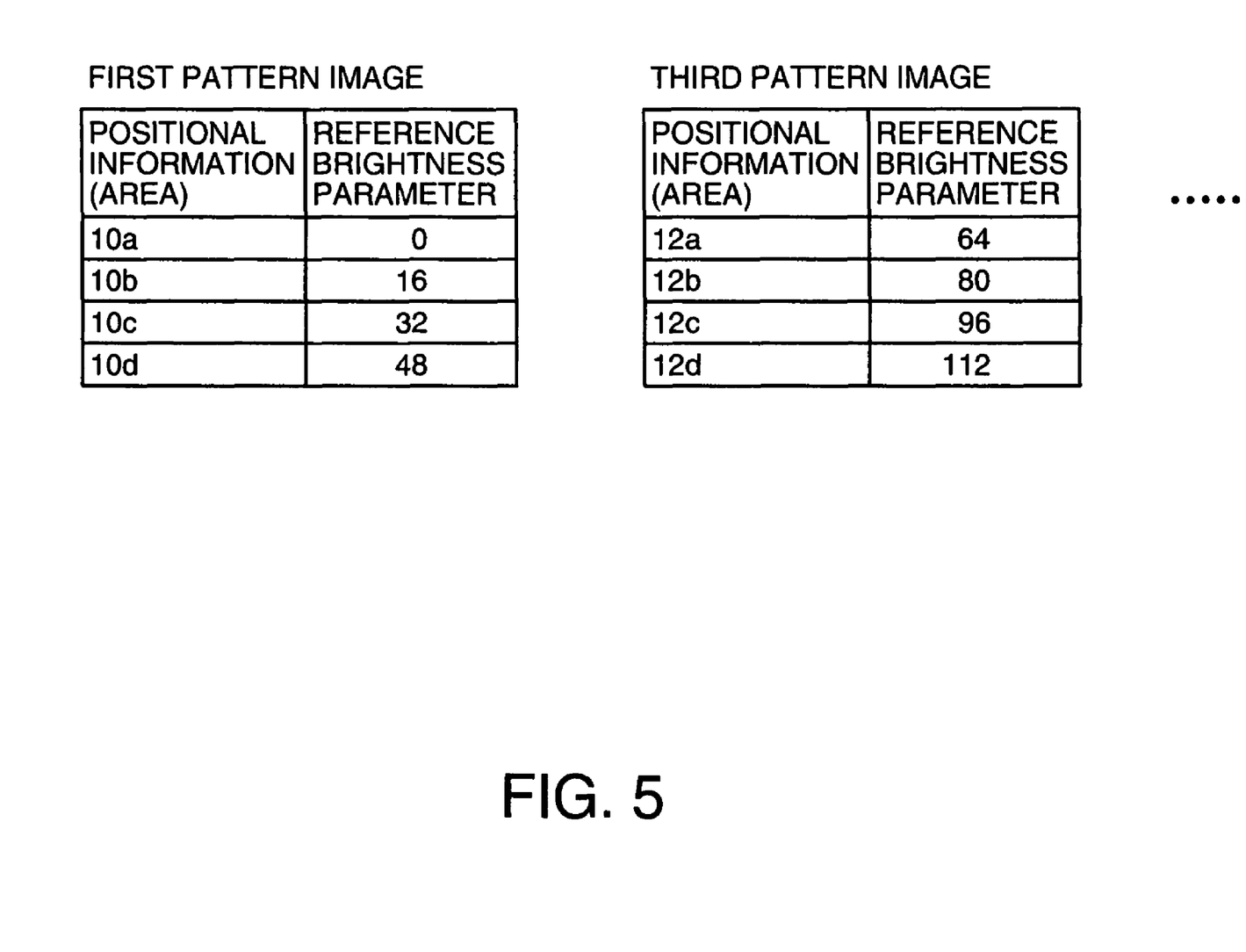
FIG. 5 is a drawing showing a data table of a reference brightness parameter according to the embodiment of the invention.

The reference brightness parameter storing unit b4a of the liquid crystal projector B stores gray pattern gray levels set for each areas of the divided pattern in advance as the reference brightness parameter for each divided pattern image. More specifically, as shown in FIG. 5, for example, numerical values (0 16, 32, 48) which indicate the reference brightness parameters corresponding to the first pattern image 10 are stored with positional information (XY coordinate in the frame) of the respective areas as one set of data table. The reference brightness parameters corresponding to the third pattern image 12 or other divided pattern images are also stored in the same manner.

In Step S2, the image signal indicating the adjustment pattern image as described above is supplied from the image supply device A to the input unit b1 of the liquid crystal projector B together with the synchronizing signals. Furthermore, the image signals and the synchronizing signals are outputted from the input unit b1 to the brightness parameter detecting unit b2. The brightness parameter detecting unit b2 converts the analogue image signal to the digital image signal. In other words, although the analogue image signal has a magnitude of a voltage value as the brightness information of the image, when it is converted into the digital image signal, it has a gray level corresponding to the voltage value as the brightness information (brightness parameter).

Figure 6:
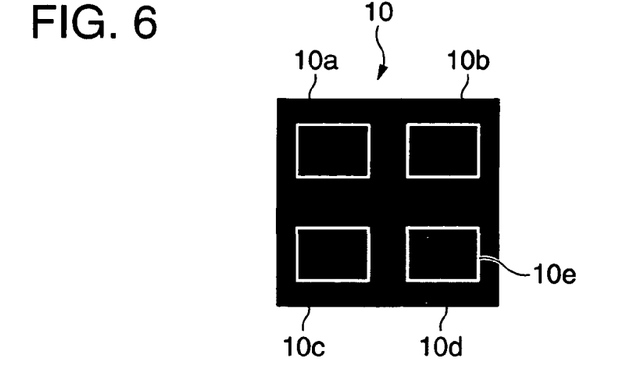
FIG. 6 is an explanatory drawing showing a method of detecting a brightness parameter according to the embodiment of the invention.

In the case where the digital image signal indicates the first pattern image 10 out of the adjustment pattern images, the brightness parameter detecting unit b2 detects a brightness parameter in regions (detection areas 10e) which are smaller than the respective divided areas (10a-10d) as shown in FIG. 6 from the digital image signal for one frame of the first pattern image 10 (Step S3). The brightness parameter detection process as described above is applied to each area. At this time, the brightness parameters at several points in the detection area 10e are detected, and an average value of the detected parameters are determined to be the brightness parameter of that area. By employing the average value in this manner, fluctuations in brightness parameter due to the influence of the noise or the like is absorbed, whereby the detection accuracy of the brightness parameter can be enhanced.

In order to know which brightness parameter belongs to which detection area 10e, that is, positional information of the brightness parameter in the digital image signals for one frame, it is necessary to determine the positional information from the synchronizing signal. Therefore, for example, when an attempt is made to detect the brightness parameter not from the detection area 10e, but from a large area such as the area 10a, if the synchronizing signal does not indicate the accurate positional information (when noise is contained in the synchronizing signal, when delay is occurred, etc.), there is a possibility that the brightness parameter of another adjacent area is detected when detecting the brightness parameter in the area 10a. Therefore, in this embodiment, by employing a smaller region than the large area such as the area 10a as the detection area 10e as described above, even when there is an error in the positional information indicated by the synchronizing signal, the brightness parameter in the predetermined area can reliably be detected.

In this manner, when the brightness parameter detecting unit b2 detects the brightness parameters in the respective areas (that is, the detection areas 10e) of the first pattern image 10, it outputs the positional information which indicates the detected positions of the corresponding brightness parameters and pattern identification information for identifying the divided pattern image where detection has made (that is, information indicating that detection is made in the first pattern image 10) to the image correction table preparing unit b3 together with the brightness parameters.

Subsequently, when a predetermined time is elapsed, the digital image signal indicating the next second pattern image 11 (entirely black pattern image) is supplied to the brightness parameter detecting unit b2. The brightness parameter detecting unit b2 detects the brightness parameters in the same manner as described above. However, since the pattern is the entirely black pattern in this case, the value of the brightness parameter is all the same in all detection areas. In such a case, the brightness parameter detecting unit b2 determines that the second pattern image 11 which is currently under the detection process is to be excluded from the object of detection process, and the brightness parameter, the positional information and the pattern identification information relating to the second pattern image 11 are not outputted to the image correction table preparing unit b3.

When a predetermined time is further elapsed and the digital image signal indicating the next third pattern image 12 is supplied to the brightness parameter detecting unit b2, the brightness pattern detecting unit b2 detects the different brightness parameters for the respective detection areas. Therefore, the pattern image is determined to be an object of the detection process, and hence the brightness parameter, the positional information and the pattern identification information relating to the third pattern image 12 (that is, information indicating that detection is made in the third pattern image 12) are outputted to the image correction table preparing unit b3.

Here, for example, when the adjustment pattern image is composed only of the divided pattern images without inserting the entirely black pattern images, identification of switching of the divided pattern images becomes difficult, and which divided pattern image the brightness parameter being currently detected corresponds to cannot be determined accurately. Therefore, in this embodiment, identification of the divided pattern image is performed accurately by inserting the entirely black pattern images among the divided pattern images as described above and determining the switching of the pattern images.

The brightness parameter detecting unit b2 outputs the brightness parameters, the positional information and the pattern identification information relating to the respective divided pattern images in sequence to the image correction table preparing unit b3 by repeating the brightness parameter detection process as described above.

The image correction table preparing unit b3 prepares the image correction table on the basis of the brightness parameters, the positional information and the pattern identification information relating to the respective divided pattern images obtained as described above, and the data table relating to the reference brightness parameters stored in the reference brightness parameter storing unit b4a (shown in FIG. 5) (Step S4).

Figure 7:
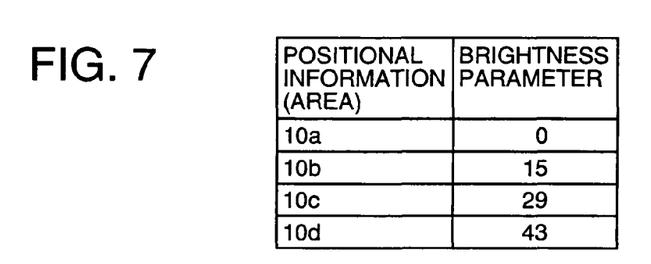
FIG. 7 is a drawing showing an example of the brightness parameter detected from a first pattern image 10 according to the embodiment of the present invention.

Hereinafter, the image correction table preparation process is described in detail using the brightness parameters, the positional information and the pattern identification information relating to the first pattern image 10. Here, it is assumed that values shown in FIG. 7 are obtained as the brightness parameters relating to the first pattern image 10. As will be seen when comparing FIG. 7 with FIG. 5, when the first pattern image 10 is outputted from the image supply device A, the reference brightness parameter and the brightness parameter actually detected have different value due to the mismatch between the γ correction of the image supply device A and the γ characteristics of the liquid crystal projector B.

The image correction table preparing unit b3 acquires the reference brightness parameter relating to the first pattern image 10 from the reference brightness parameter storing unit b4a on the basis of the pattern identification information. Then, paring of the reference brightness parameter and the brightness parameter is performed on the basis of the positional information thereof, and a correction coefficient k is calculated (k=reference brightness parameter/brightness parameter).

Figure 8:
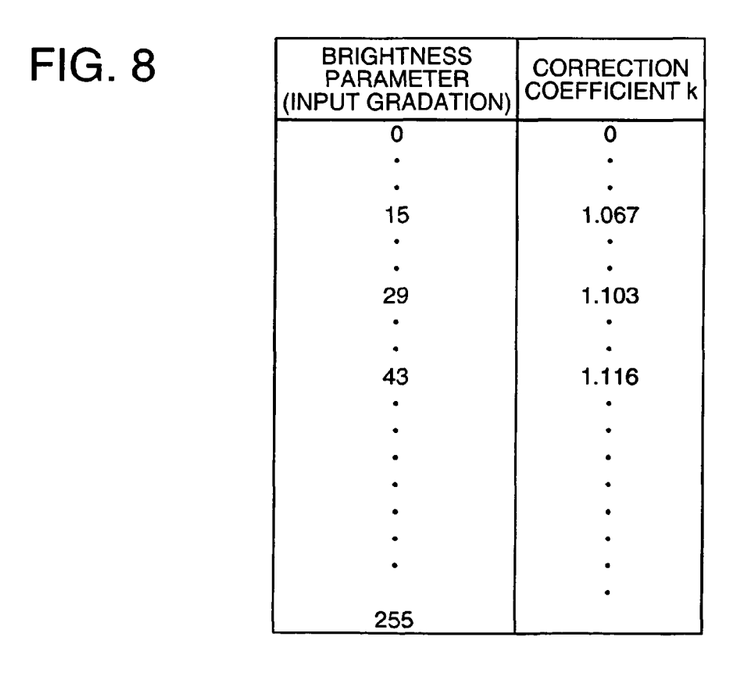
FIG. 8 is an explanatory drawing showing an image correction table according to the embodiment of the invention.

For example, when the correction coefficient k is calculated from the brightness parameter detected in the area 10a of the first pattern image 10, the correction coefficient k is expressed by k=0/0=0. In the same manner, a correction coefficient in the area 10b is k=6/15=1.067, a correction coefficient in the area 10c is k=32/29=1.103, and a correction coefficient in the area 10d is k=48/43=1.116. Then, as shown in FIG. 8, the correspondence relation between the brightness parameters and the correction coefficients k calculated on the basis of the brightness parameters are listed as the image correction table. The image correction table preparing unit b3 repeats the above-described process on the basis of the brightness parameters relating to the respective divided pattern images and the reference brightness parameter stored in the reference brightness parameter storing unit b4a, whereby the correction coefficient k corresponding to the respective gray levels (brightness parameters) of the 0-255 gray levels is calculated to complete the image correction table.

In this embodiment, since the gray patterns are set in every 16 gray levels in the adjustment pattern image, the correction coefficient k corresponding to the gray levels other than the every 16 gray levels (for example, gray levels between 16 to 32 gray levels) are calculated by interpolation process. By breaking the gray pattern levels further into parts, the image correction table of high level of accuracy can be prepared.

As described above, the image correction table preparing unit b3 prepares the image correction table, and stores the same into the memory b4 (Step S5).

The adjustment mode is ended with the procedure described above. Since it is not necessary to display the adjustment pattern image on the screen 527 in the adjustment mode, the image correcting unit b5 is set to the non-active state. However, it is also applicable to display, for example, the phrase "being adjusted" on the screen 527 during the adjustment mode.

Normal Operation Mode

Subsequently, the normal operation mode will be described.

When the adjustment mode is ended, the mode changeover switch is operated by the user to switch to the normal operation mode. Alternatively, it may be adapted to be changed automatically to the normal operation mode when the adjustment mode is ended.

Subsequently, the user sets the desired DVD to the image supply apparatus A. The image supply device A outputs a synchronizing signal to the input unit b1 of the liquid crystal projector B together with the image signal which indicates the image stored in the DVD. Furthermore, the image signal and the synchronizing signal are outputted from the input unit b1 to the brightness parameter detecting unit b2. In the normal operation mode, the brightness parameter detecting unit b2 converts the analogue image signal to the digital image signal, and then outputs the digital image signal and the synchronizing signal to the image correcting unit b5.

The image correcting unit b5 searches and extracts a correction coefficient k corresponding to the brightness parameter contained in the digital image signal from the image correction table stored in the memory b4, and the extracted correction coefficient k is multiplied to the brightness parameter. Accordingly, for example, assuming that the brightness parameter contained in the digital image signal is 15, the correction coefficient k corresponding to the brightness parameter 15 is; k=1.067 from FIG. 8. When the brightness parameter 15 is multiplied by the correction coefficient k=1.067, the brightness parameter becomes 16, which is corrected to a suitable brightness parameter for the γ characteristic of the liquid crystal projector B.

The image correcting unit b5 performs the correction process as described above for every brightness parameter contained in the digital image signal, and outputs the synchronizing signal together with the corrected digital image signal to the image analyzing unit b6 and the image processing unit b7.

The image analyzing unit b6 sets an expansion parameter and a light modulation parameter suitable for the image scene indicated by the corrected digital image signal on the basis of the corrected digital image signal, outputs the expansion parameter to the image processing unit b7, and outputs the light modulation parameter to the light modulation element driver b9.

The image processing unit b7 applies a predetermined expansion process to the corrected digital image signal on the basis of the expansion parameter, converts the digital image signal after having applied with the expansion process into the analogue image signal, and then outputs the same to the light valve driver b8 together with the synchronizing signal. The light valve driver b8 generates drive signals for driving the red light liquid crystal light valve 522, the green light liquid crystal light valve 523 and the blue light liquid crystal light valve 524 on the basis of the analogue image signal and the synchronizing signal, and outputs the same to the respective liquid crystal light valves.

The respective liquid crystal valve is driven by the drive signals, and modulates three colored lights (red light, green light and blue light) incoming respectively thereto. The light modulation element driver b9 outputs the drive signal for driving the light modulation element 26 on the basis of the light modulation parameter to the light modulation element 26. The light modulation element 26 is driven on the basis of the drive signal, thereby changing the light amount emitted from the light source 510. With the operation described above, an image in the DVD is displayed on the screen 527.

The operation of the liquid crystal projector B in the normal operation mode has been described thus far. As described above, according to this embodiment, the image signal can be corrected with a relatively simple process without necessity to detect the γ value of the image signal supplied from the image supply device A as in the related art and, as a consequence, the image display is effected by the image signal that matches the γ characteristics of the liquid crystal projector B. Therefore a high quality of display can be realized.

When the image supply device A is changed (for example, when the DVD player is replaced by the PC), it can support any types of image supply device A by performing again the process in the adjustment mode and preparing a new image correction table according to the image supply device A after replacement.

The invention is not limited to the above-described embodiment, and for example, a modification shown below is conceivable.

(1) In the above-described embodiment, the image signal is corrected by the correction coefficient k. However, the invention is not limited thereto, and correction may be performed by obtaining the difference between the reference brightness parameter and the brightness parameter as the correction value, and in the normal operation mode, by adding the correction value to the brightness parameter contained in the digital image signal. Alternatively, correction may be performed by preparing an image correction table containing the relation of correspondence between the reference brightness parameter and the brightness parameter, and in the normal operation mode, extracting the reference brightness parameter corresponding to the brightness parameter contained in the digital image signal from the image correction table and converting the value of the brightness parameter into the reference brightness parameter.

(2) In the above-described embodiment, one frame is divided into four areas in the adjustment pattern image. However, the number of divided areas may be changed as needed. Alternatively, one gray pattern may be set to one frame without dividing the frame.

(3) In the above-described embodiment, correction is made for all the gray levels. However, the invention is not limited thereto, and, for example, when improvement of the display quality only in black is desired, correction may be applied only to the black gray level. In this case, only the entirely black pattern image is needed as the adjustment pattern image. The same thing can be applied when improvement of the display quality only in white is desired as well.

(4) In the above-described embodiment, the gray patterns, that is, the patterns of the same gray levels are set for R, G and B as the adjustment pattern image. However, the invention is not limited thereto, and it is also possible to set the pattern images independently for R, G and B, and correct the brightness parameters independently for R, G and B. Since the γ characteristics are different respectively for R, G, and B, the display quality can further be improved by performing the correction as described above.

(5) In the above-described embodiment, the adjustment pattern images are stored in recording media such as the DVD or the floppy (registered trademark) disk. However, the invention is not limited thereto, and the adjustment pattern images may be delivered through a network.

Figure 9:
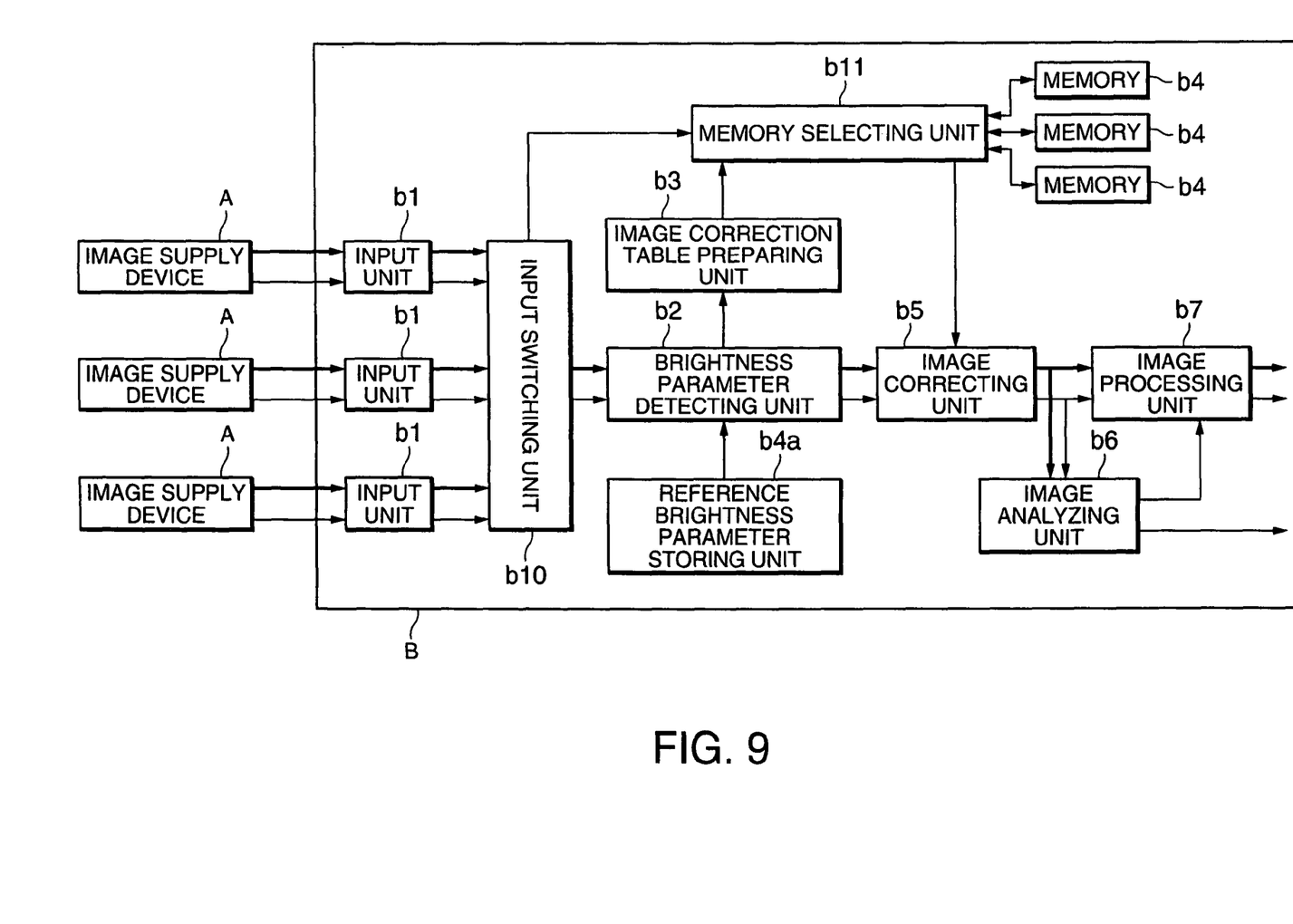
FIG. 9 is a schematic block diagram showing a drive circuit in a case in which a plurality of image supply devices A are connected to the liquid crystal projector B in a modification of the invention.

(6) In the above-described embodiment, the case in which a single image supply device A is connected to the liquid crystal projector B has been described. However, the invention is not limited thereto, and as shown in FIG. 9, the invention is also applicable to a case in which the liquid crystal projector B can be connected to a plurality of image supply devices A. In such a case, for example, a plurality of memories b4 for storing the image correction tables corresponding to the respective image supply devices A and a memory selecting unit b11 for selecting the memories b4 synchronously with the input switching signal supplied from an input switching unit b10 are provided as shown in the drawing. Then, when the correction process is performed by the image correcting unit b5, the memory b4 in which the image correction table suitable for the image signal switched by the input switching unit b10 is stored is selected by the memory selecting unit b11. In this manner, the invention can be applied also the case in which the plurality of image supply devices A are connected.

When the plurality of image correction tables are provided as described above, it is also possible to adapt in such a manner that the desired image correction table can be selected by the user's operation.

The entire disclosure of Japanese Patent Application No. 2005-174885, filed Jun. 15, 2005 is expressly incorporated by reference herein.

What is claimed is:

1. An image display device for displaying an image on the basis of an image signal supplied from an image supply device comprising:

a brightness detecting section that detects and obtains, directly from a pattern image signal, a gray level which characterizes brightness of a plurality of grayscale areas respectively of a plurality of predetermined pattern images of the pattern image signal when the plurality of predetermined pattern images are supplied from the image supply device, each of the plurality of the predetermined pattern images including the plurality of grayscale areas on one frame and each area being set to a predetermined gray level;

a storing section that stores a reference gray level predetermined in each of the plurality of predetermined pattern images;

a correction parameter setting section that sets a correction parameter for compensating by a difference between the gray level detected by the brightness detecting section and the reference gray level stored in the storing section; and a correcting section that corrects the brightness of the image signal supplied from the image supply device on the basis of the correction parameter, wherein the brightness detecting section sets regions of the plurality of grayscale areas as detection areas that are smaller than their corresponding grayscale area and detects gray levels for the respective detection areas, and detects and obtains, directly from a synchronizing signal, positional information of a brightness parameter in regions of the plurality of grayscale areas, and at least one area of the plurality of grayscale areas of at least one of the plurality of predetermined pattern images is set to a different predetermined gray level than the level of at least another area of the plurality of grayscale areas of the at least one of the plurality of predetermined pattern images.

2. The image display device according to claim 1, wherein at least a second one of the plurality of predetermined pattern images is composed of a black full-frame pattern set to a black level, the brightness detecting section detects a gray level of the black full-frame pattern, and the storing section stores a reference gray level of the black full-frame pattern in advance.

3. The image display device according to claim 1, wherein at least a second one of the plurality of predetermined pattern images is composed of a white full-frame pattern set to a white level, the brightness detecting section detects a gray level of the white full-frame pattern, and the storing section stores a reference gray level of the white full-frame pattern in advance.

4. The image display device according to claim 1, wherein each of the plurality of predetermined pattern images appears alternately at certain time intervals, and the storing section stores the reference gray levels for the plurality of areas respectively in advance.

5. The image display device according to claim 4, wherein the brightness detecting section detects the gray levels at a plurality of points for each of the plurality of areas, and determines an average value of the gray levels at the plurality of points as the gray level for each of the plurality of areas.

6. The image display device according to claim 1, wherein the correction parameter setting section calculates a correction coefficient by dividing the reference gray level by the gray level detected by the brightness detecting section, and setting the correction coefficient as the correction parameter, and the correcting section corrects the brightness of the image by multiplying the gray level contained in the image signal supplied from the image supply device by the correction coefficient.

7. The image display device according to claim 1, further comprising a light modulation processing section that adjusts a light amount of an illumination light and an expansion processing section that expands the gray level contained in the image signal.

8. The image display device according to claim 1, wherein each area of the at least one of the plurality of predetermined pattern images is set to a different predetermined gray level.

9. An image display method for displaying an image on the basis of an image signal supplied from the image supply device comprising:

storing a reference gray level set for a plurality of predetermined pattern images in advance, each of the predetermined pattern images including a plurality of grayscale areas on one frame and each area being set to a predetermined gray level;

detecting and obtaining a gray level, directly from a pattern image signal, which characterizes the brightness of the plurality of grayscale areas respectively of the plurality of predetermined pattern images from the pattern image signal when the plurality of predetermined pattern images are supplied from the image supply device;

setting a correction parameter for compensating by a difference between the gray level detected in the detecting step and the reference gray level stored in the storing step; and correcting the brightness of the image signal supplied from the image supply device on the basis of the correction parameter, wherein regions of the plurality of grayscale areas are set as detection areas that are smaller than their corresponding grayscale area, gray levels for the respective detection areas are detected, and at least one area of the plurality of grayscale areas of at least one of the plurality of predetermined pattern images is set to a different predetermined gray level than the level of at least another area of the plurality of grayscale areas of the at least one of the plurality of predetermined pattern images, and positional information of a brightness parameter in regions of the plurality of grayscale areas is detected and obtained directly from a synchronization signal.

10. The image display method of claim 9, wherein each area of the at least one of the plurality of predetermined pattern images is set to a different predetermined gray level.

* * * * *